United States Patent
Isozaki et al.

(10) Patent No.: US 9,112,835 B2
(45) Date of Patent: Aug. 18, 2015

(54) TRANSMITTER, RECEIVER, AND TRANSMITTING METHOD

(71) Applicant: KABUSHIKI KAISHA TOSHIBA, Tokyo (JP)

(72) Inventors: Hiroshi Isozaki, Kawasaki (JP); Hiroyuki Chaki, Ome (JP); Kazunobu Konda, Tokyo (JP); Takashi Kokubo, Ome (JP); Hideki Ohkita, Kunitachi (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 249 days.

(21) Appl. No.: 13/914,392

(22) Filed: Jun. 10, 2013

(65) Prior Publication Data

US 2013/0275759 A1  Oct. 17, 2013

Related U.S. Application Data

(63) Continuation of application No. 11/710,467, filed on Feb. 26, 2007, now abandoned.

(30) Foreign Application Priority Data

Feb. 27, 2006  (JP) .................... 2006-051200

(51) Int. Cl.
*H04L 29/06* (2006.01)
*H04N 7/167* (2011.01)
(Continued)

(52) U.S. Cl.
CPC .......... *H04L 63/0428* (2013.01); *H04N 7/1675* (2013.01); *H04N 21/2347* (2013.01); *H04N 21/25816* (2013.01); *H04N 21/25875* (2013.01); *H04N 21/26609* (2013.01); *H04N 21/26613* (2013.01); *H04N 21/4405* (2013.01); *H04N 21/4623* (2013.01); *H04N 21/4627* (2013.01); *H04N 21/63345* (2013.01); *H04N 21/6582* (2013.01); *H04N 21/8355* (2013.01)

(58) Field of Classification Search
None
See application file for complete search history.

(56) References Cited

U.S. PATENT DOCUMENTS

| 6,940,977 | B1 | 9/2005 | Manabe |
| 2002/0114462 | A1 | 8/2002 | Kudo et al. |

(Continued)

FOREIGN PATENT DOCUMENTS

| CN | 1666192 | 9/2005 |
| CN | 1716844 | 1/2006 |

(Continued)

OTHER PUBLICATIONS

Digital Transmission Content Protection Specification vol. 1 (Informational Version), the "5C", Feb. 28, 2005, pp. 1-81.*

(Continued)

*Primary Examiner* — Minh Dinh
(74) *Attorney, Agent, or Firm* — Finnegan, Henderson, Farabow, Garrett & Dunner, LLP

(57) ABSTRACT

According to one embodiment, a transmitting method transmits a start request for an authentication and key exchange from at least one of receivers to the transmitter, performs an authentication and key exchange for at least one of a first key common to the receivers and a second key peculiar to the at least one of the receivers, and encrypts the content by using a key shared by the transmitter and the at least one of the receivers to transmit the encrypted content to the at least one of the receivers.

6 Claims, 14 Drawing Sheets

(51) Int. Cl.
*H04N 21/2347* (2011.01)
*H04N 21/258* (2011.01)
*H04N 21/266* (2011.01)
*H04N 21/4405* (2011.01)
*H04N 21/4623* (2011.01)
*H04N 21/4627* (2011.01)
*H04N 21/6334* (2011.01)
*H04N 21/658* (2011.01)
*H04N 21/8355* (2011.01)

(56) References Cited

U.S. PATENT DOCUMENTS

| | | |
|---|---|---|
| 2004/0078066 A1 | 4/2004 | Ohta et al. |
| 2006/0271786 A1 | 11/2006 | Konda et al. |
| 2007/0071234 A1 | 3/2007 | Lagrange et al. |
| 2007/0162981 A1* | 7/2007 | Morioka et al. ............ 726/30 |

FOREIGN PATENT DOCUMENTS

| | | |
|---|---|---|
| JP | 2001-285284 | 10/2001 |
| JP | 2004-186800 | 7/2004 |
| JP | 2004-312216 | 11/2004 |
| JP | 2005-167645 | 6/2005 |
| JP | 2005-175709 | 6/2005 |
| JP | 2007-049468 | 2/2007 |
| WO | WO-2004/066650 | 8/2004 |
| WO | WO-2007/032315 | 3/2007 |

OTHER PUBLICATIONS

"Notice of Reasons for Rejection" issued in copending Japanese Patent Application No. 2009-000360, dated on Jun. 1, 2011, and English-language translation thereof.
Notification •of The First Office Action for Application No. 200710079936.8, State Intellectual Property Office of P.R.C. mailed Nov. 27, 2009.
Hitachi, Ltd.et al. "DTCP vol. 1, Supplement E, Mapping DTCP to IP (Informational Version)"; Revision 1.1, pp. 1-32, Feb. 28, 2005.
Notice Requesting Submission of Opinion for Application No. 10-2007-0018429, Korean Intellectual Property Office, mailed Mar. 25, 2008.
Hyeon-Jong Lee et al., "Effective Group Key Management Protocol for Secure Multicast Communication." Korea Information and Communications Society journal, vol. 28, No. 7C, pp. 733-742, 2003.
A. Menezes et al., Handbook of Applied Cryptography, chapter 1, pp. 1-48, 1996.
A. Menezes et al., Handbook of Applied Cryptography, chapter 12, pp. 489-541, 1996.
Notification of Reasons for Rejection for Application No. 2006-051200, Japanese Patent Office, mailed Oct. 28, 2008.
Notification of The First Office Action for Application No. 200710079936.8, State Intellectual Property Office of P.R.C., mailed Nov. 27, 2009.

\* cited by examiner

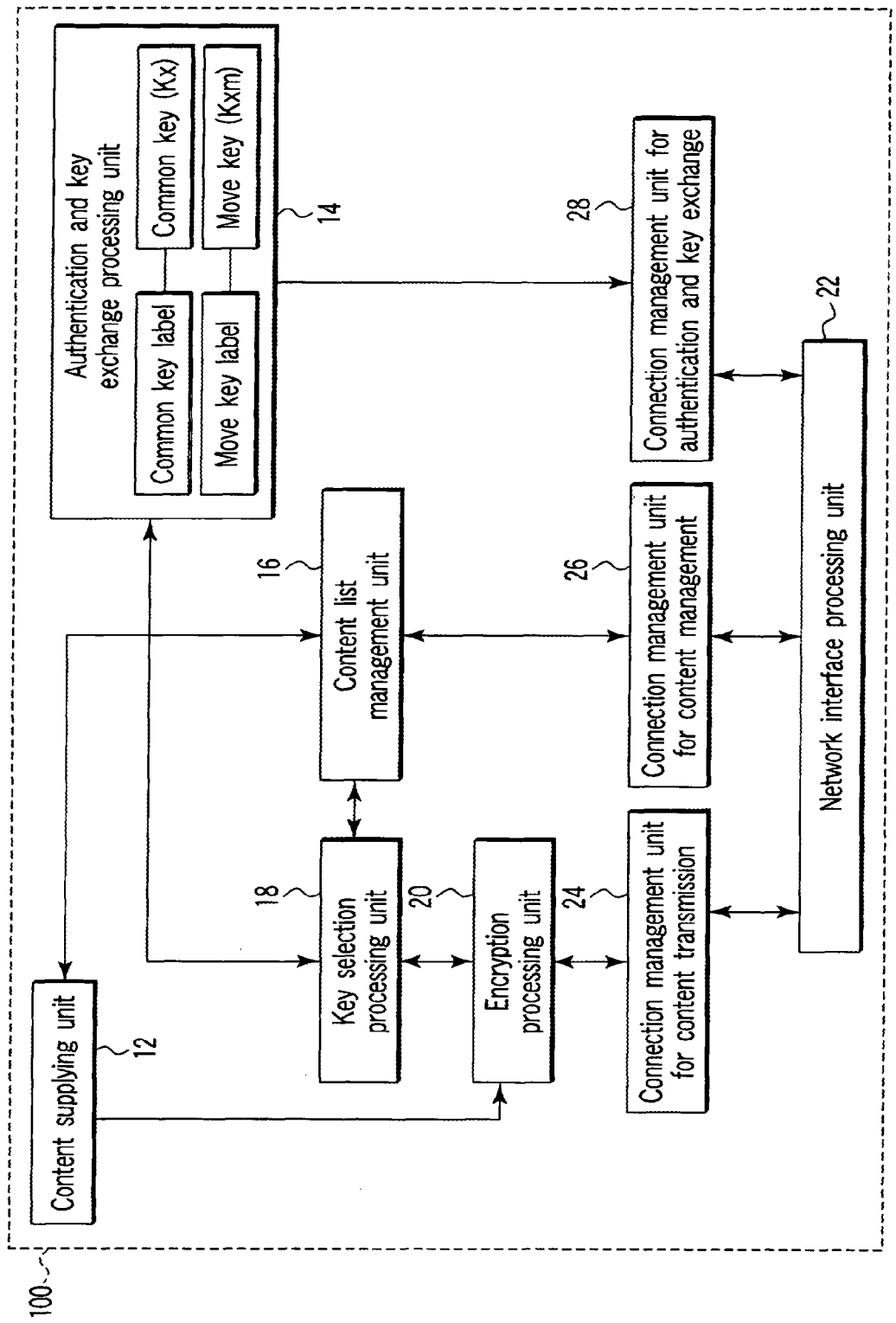
F I G. 1

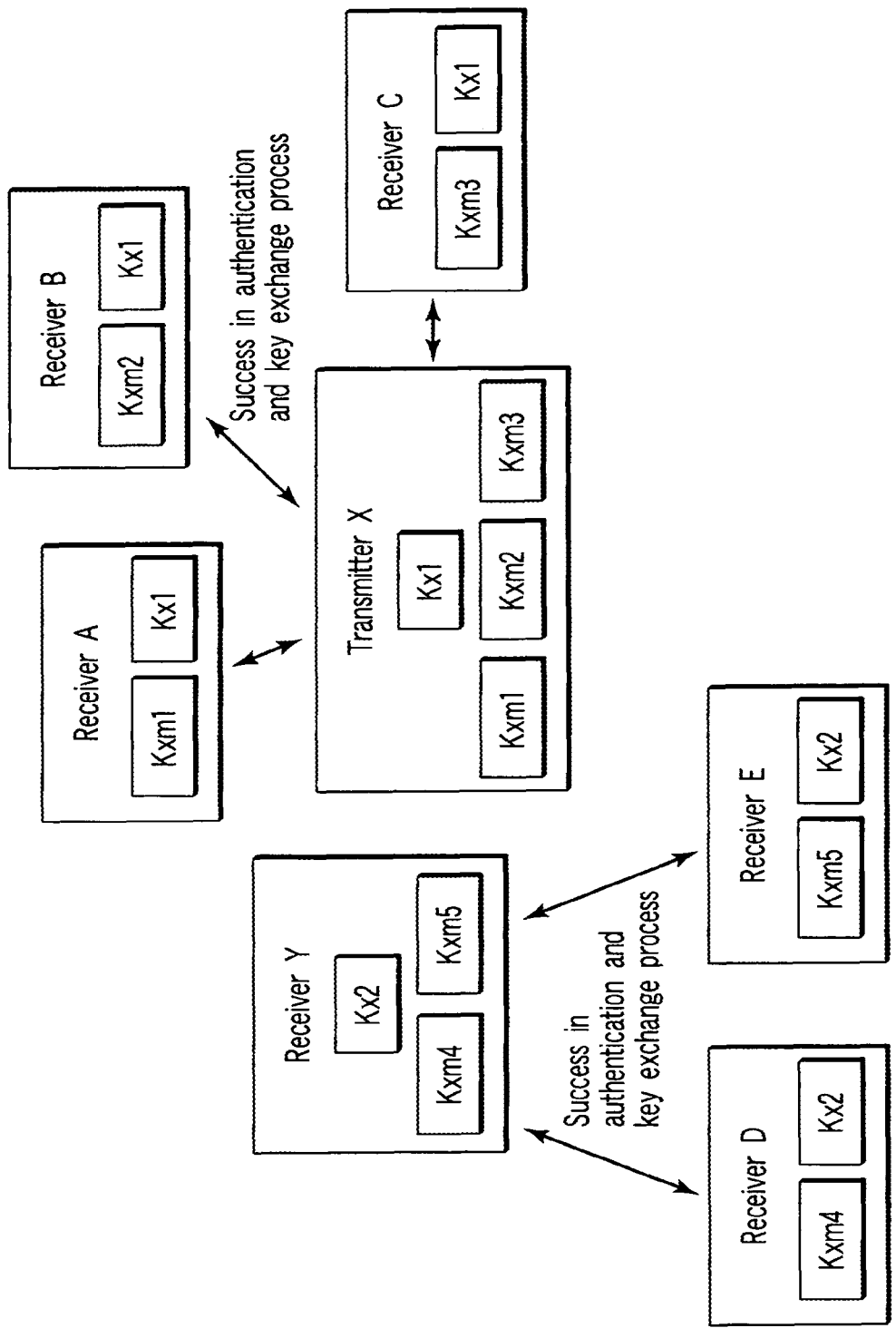
F I G. 2

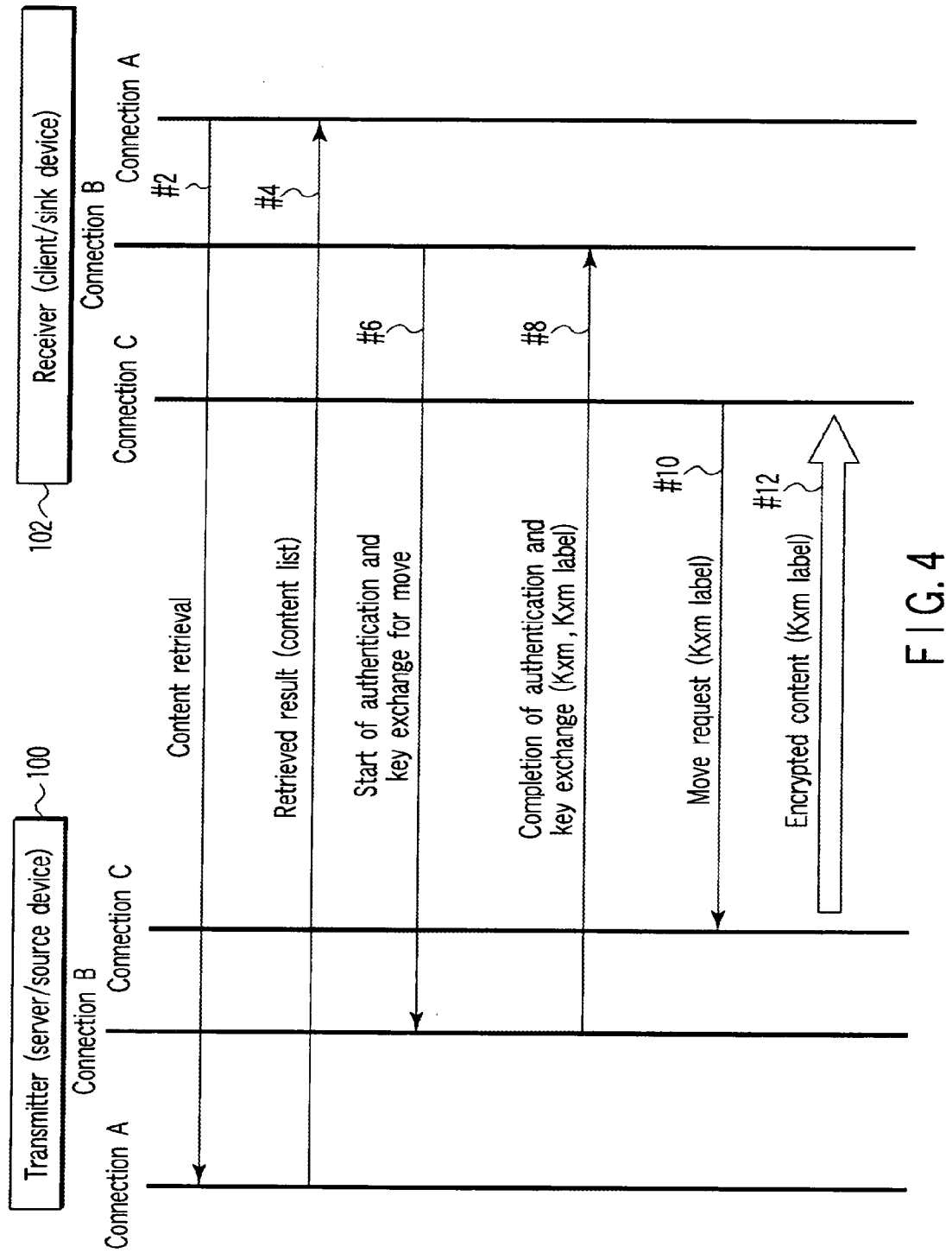
F I G. 4

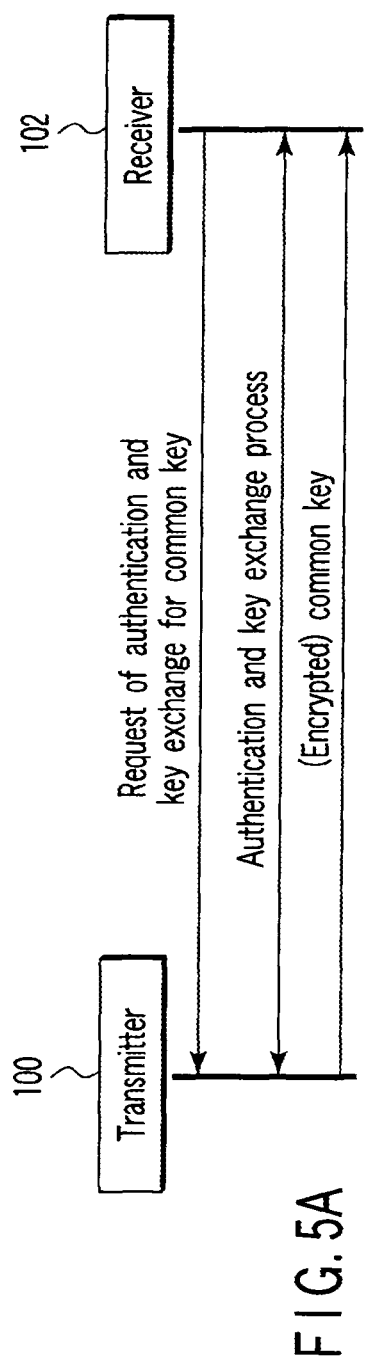
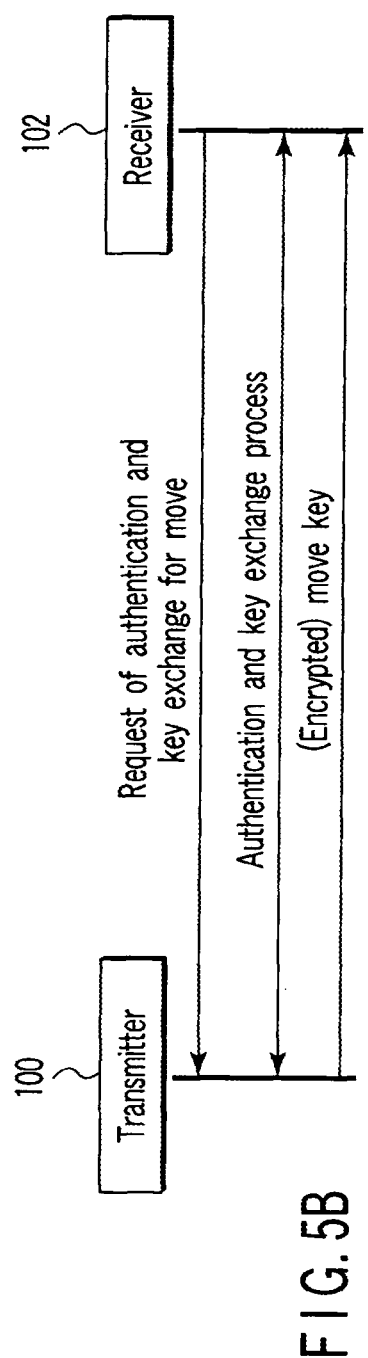
FIG. 5A
FIG. 5B

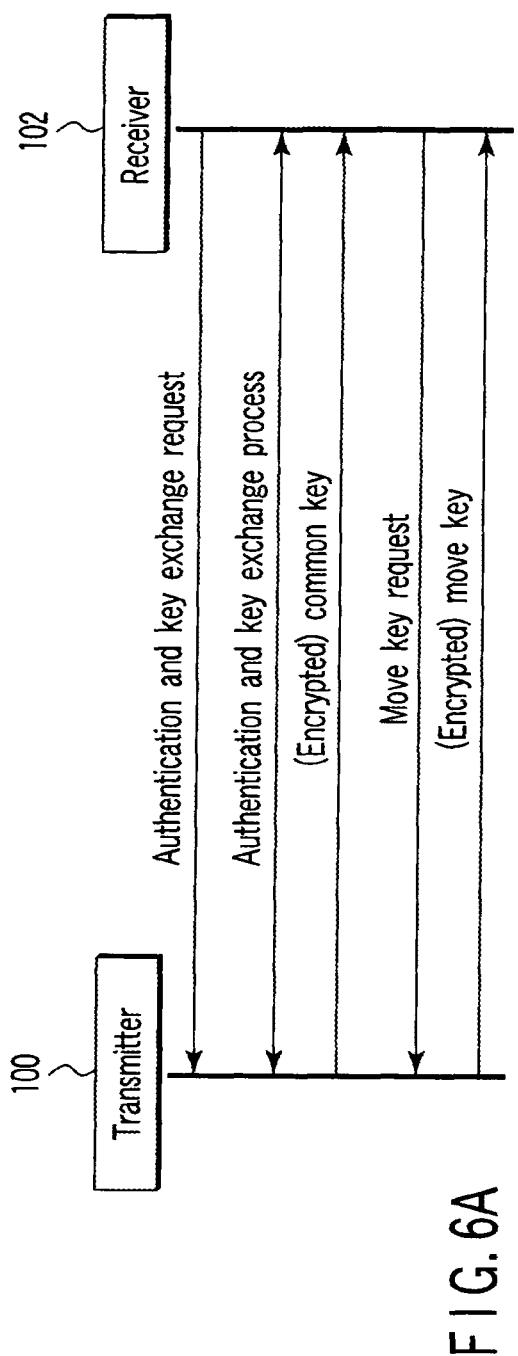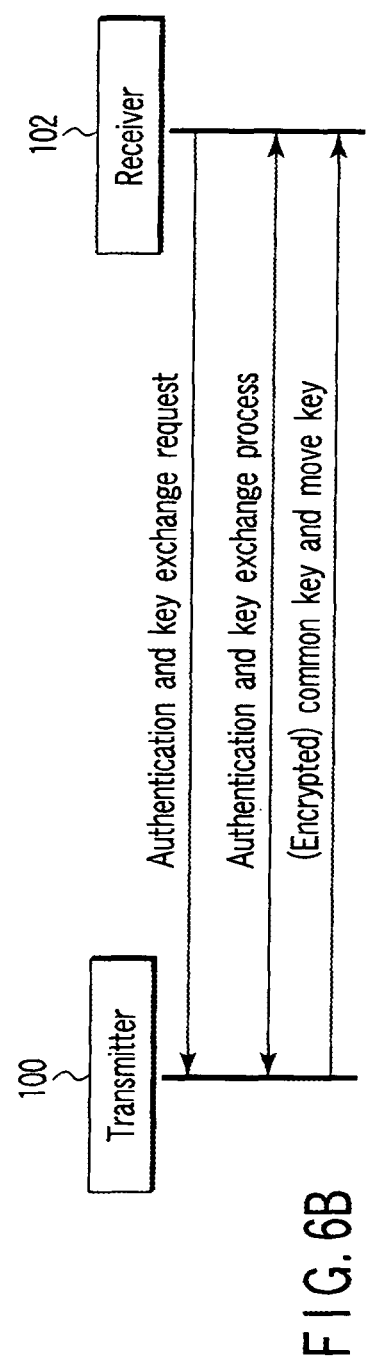
F I G. 6A
F I G. 6B

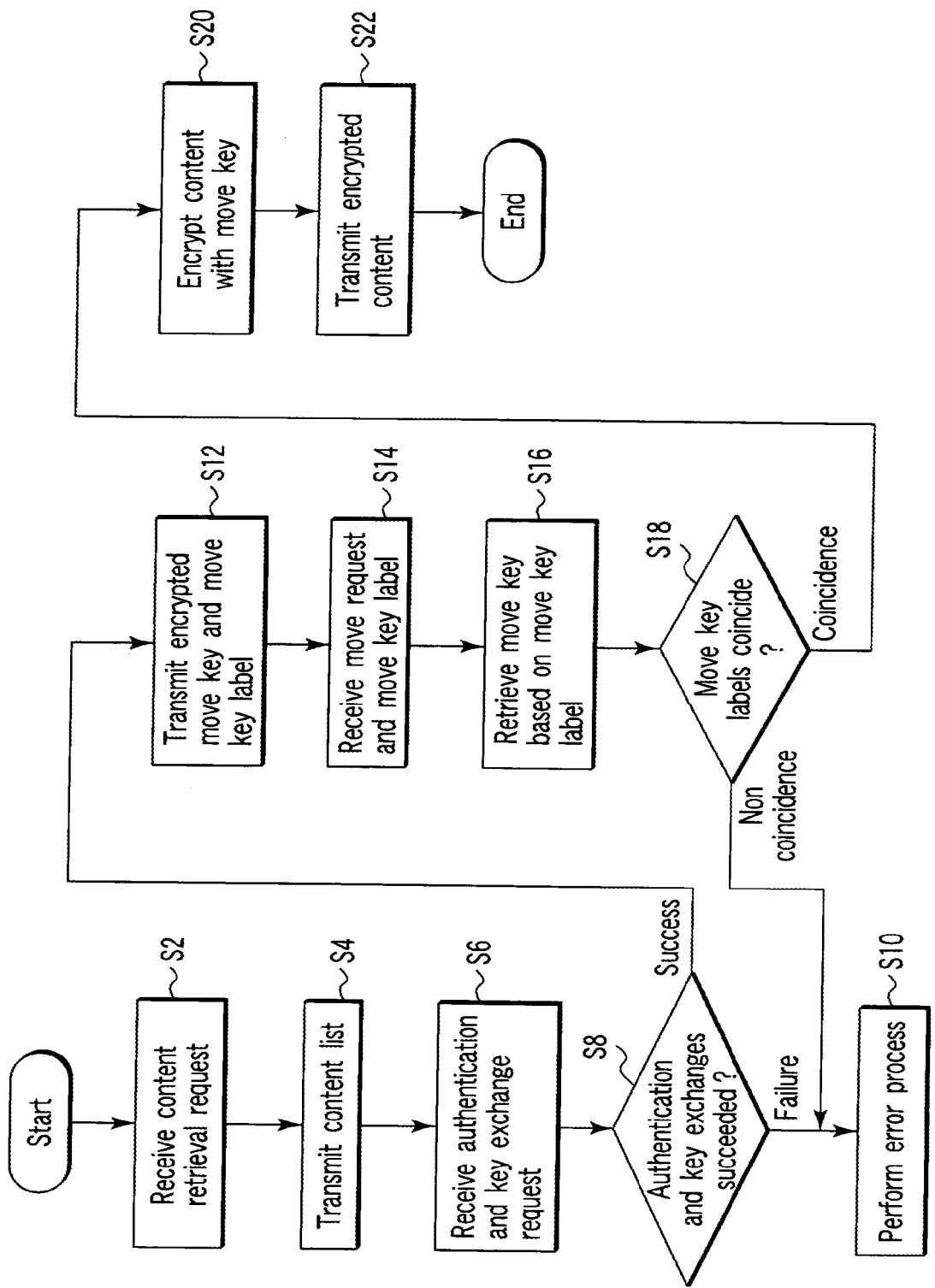
F I G. 8

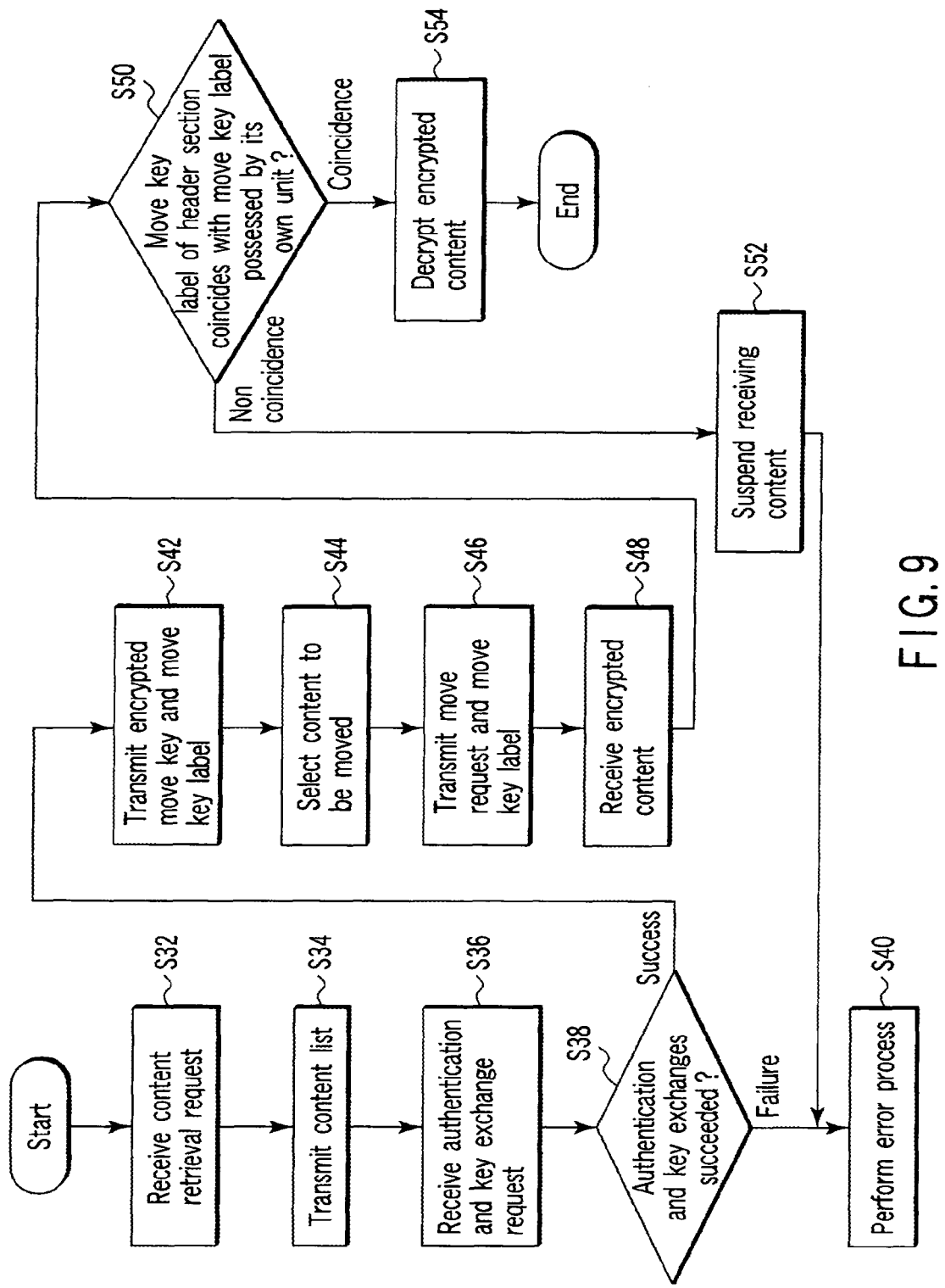
F I G. 9

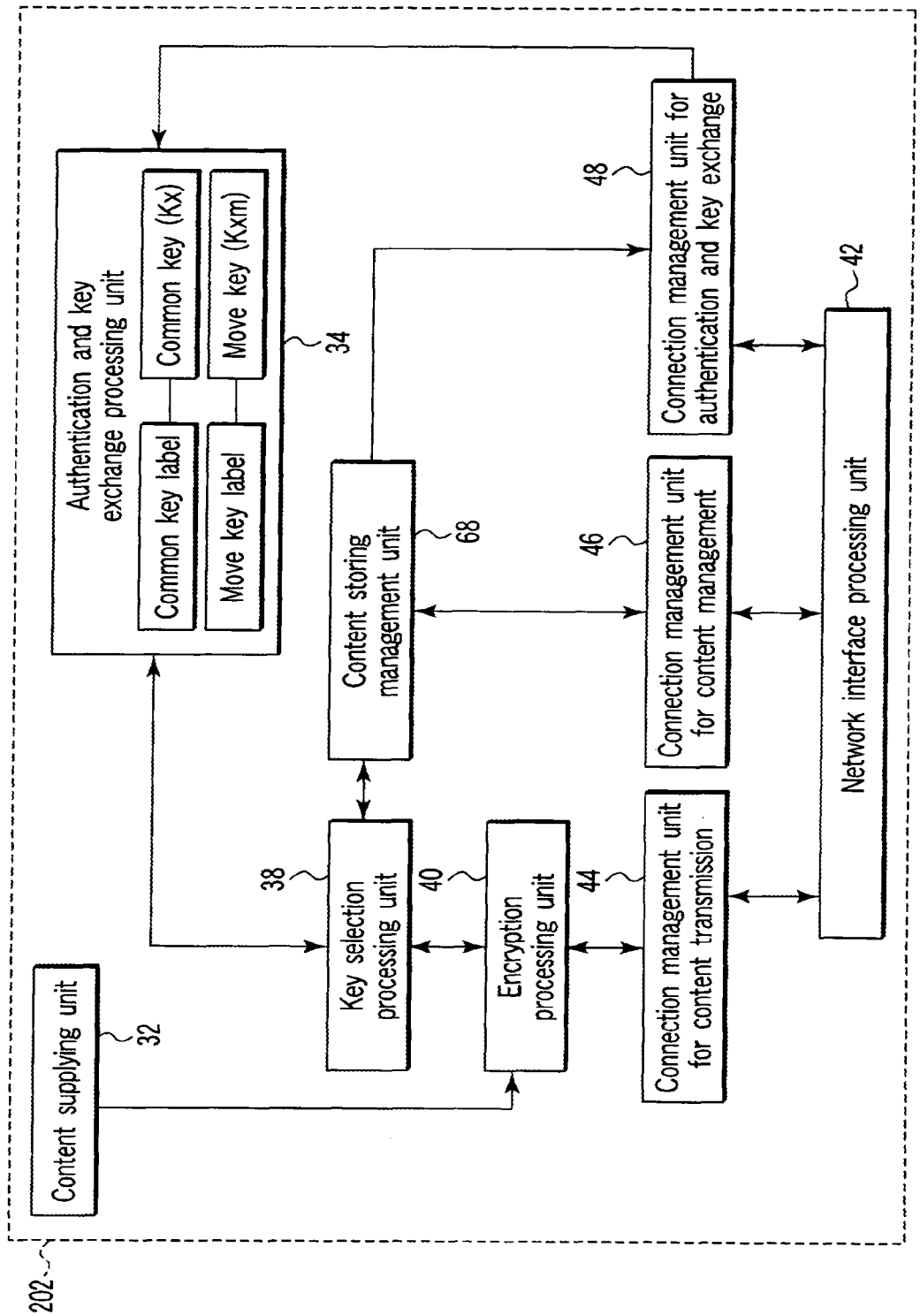
F I G. 11

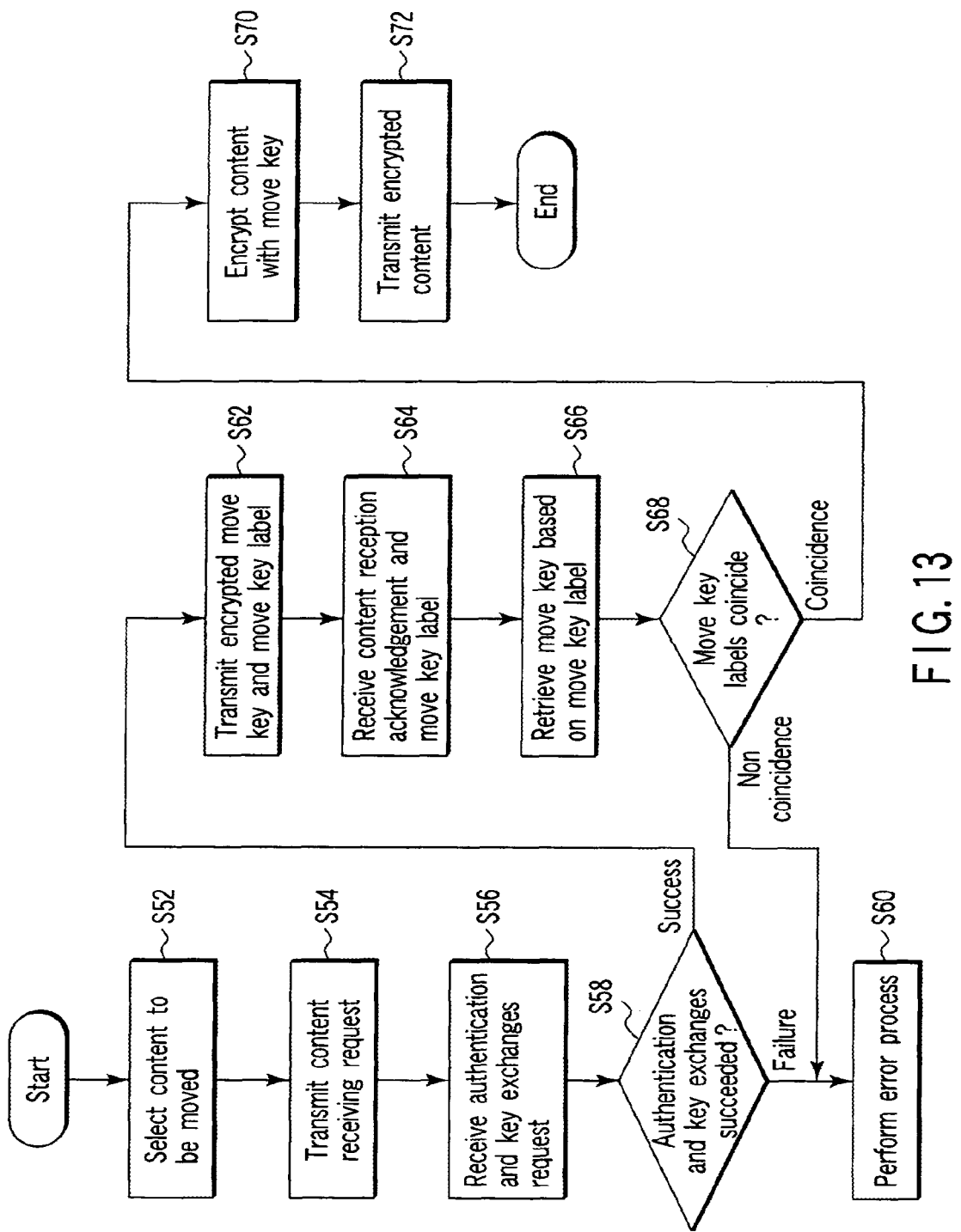
F I G. 13

TRANSMITTER, RECEIVER, AND TRANSMITTING METHOD

CROSS-REFERENCE TO RELATED APPLICATIONS

This application is based upon and claims the benefit of U.S. patent application Ser. No. 11/710,467, filed on Feb. 26, 2007, and titled "Transmitter, Receiver, and Transmitting Method," which claims priority from Japanese Patent Application No. 2006-051200, filed Feb. 27, 2006, the entire contents all of which are incorporated herein by reference.

BACKGROUND

1. Field

One embodiment of the invention relates to a transmitter, a receiver, and a transmitting method which transmits or receives a variety of contents requiring copyright protection.

2. Description of the Related Art

With the spread of a computer network, such as a broadband and a wireless LAN, and with the progress of a digital technique, a product called digital information appliance (hereinafter referred to as digital household electric appliance) with a communication function has become widely used. As a terrestrial digital broadcasting has started, in the future, more diffusion of television receivers, set top boxes, DVD recorders, etc., corresponding to a digital broadcasting are predicted. Connecting a plurality of digital household electric appliances allows a user to enjoy content via a network and put the appliances to good use.

Here, contents include a variety of items of digital data, for instance, motion image data and audio data such as MPEG-2 and MPEG-4, and document data such as text data and image data. While one hand the content including the digital data of this type has an advantage in that it can be easily copied without any deterioration, it has to be paid attention in regard to copyright thereof. For example, it is assumed that the content the copyright of which should be protected is moved from a transmitter to a receiver. When the content requiring its copyright protection is moved, it is desirable for the content which has transmitted to the receiver to be moved without being remained in the transmitter, and without being copied in a plain text on a communication path to any device other than the receiver. A means for preventing copying the content on the communication path includes a method of sharing a key between the transmitter and receiver, and encrypting the content with the key to transmit it (refer to DTCP-IP specifications "DTCP. Volume 1, Supplement E, Mapping DTCP to Ip (Information Version)" (http://www.dtcp.com).

From the point of view of efficiency of a communication, contents are further efficient to be encrypted with the same key for a model in a multicast or broadcast to simultaneously distribute the identical contents from the transmitter to a plurality of receivers. Therefore, a situation in which the plurality of receivers share the same key occurs. However, moving the contents with the keys distributed to the plurality of receivers allows the plurality of receivers to decode the contents to be moved, so that the moving of the contents is not performed normally.

Like this, the occurrence of a situation in which the moving of the contents is not executed normally and their copyrights are not protected is possible in a conventional content transmitting/receiving system.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 1 is an exemplary block diagram depicting a schematic configuration of a transmitter regarding a first embodiment;

FIG. 2 is an exemplary block diagram depicting a state of sharing a key between the transmitter and a receiver according to the first embodiment;

FIG. 4 is an exemplary flowchart depicting a whole process procedure of a content transmitting and receiving system according to the first embodiment;

FIG. 5A and FIG. 5B are, respectively, exemplary flowcharts depicting process procedures related to authentication and key exchanges of the content transmitting and receiving systems according to the first embodiment;

FIG. 6A and FIG. 6B are, respectively, another exemplary flowcharts depicting the process procedures related to the authentication and key exchanges of the content transmitting and receiving systems according to the first embodiment;

FIG. 8 is an exemplary view depicting an example of a flowchart of the transmitter according to the first embodiment;

FIG. 9 is an exemplary view depicting an example of a flowchart of the receiver according to the first embodiment;

FIG. 11 is an exemplary block diagram depicting a schematic configuration of a receiver according to the second embodiment;

FIG. 13 is an exemplary view depicting an example of a flowchart of a transmitter according to the second embodiment.

DETAILED DESCRIPTION

Figure 3:
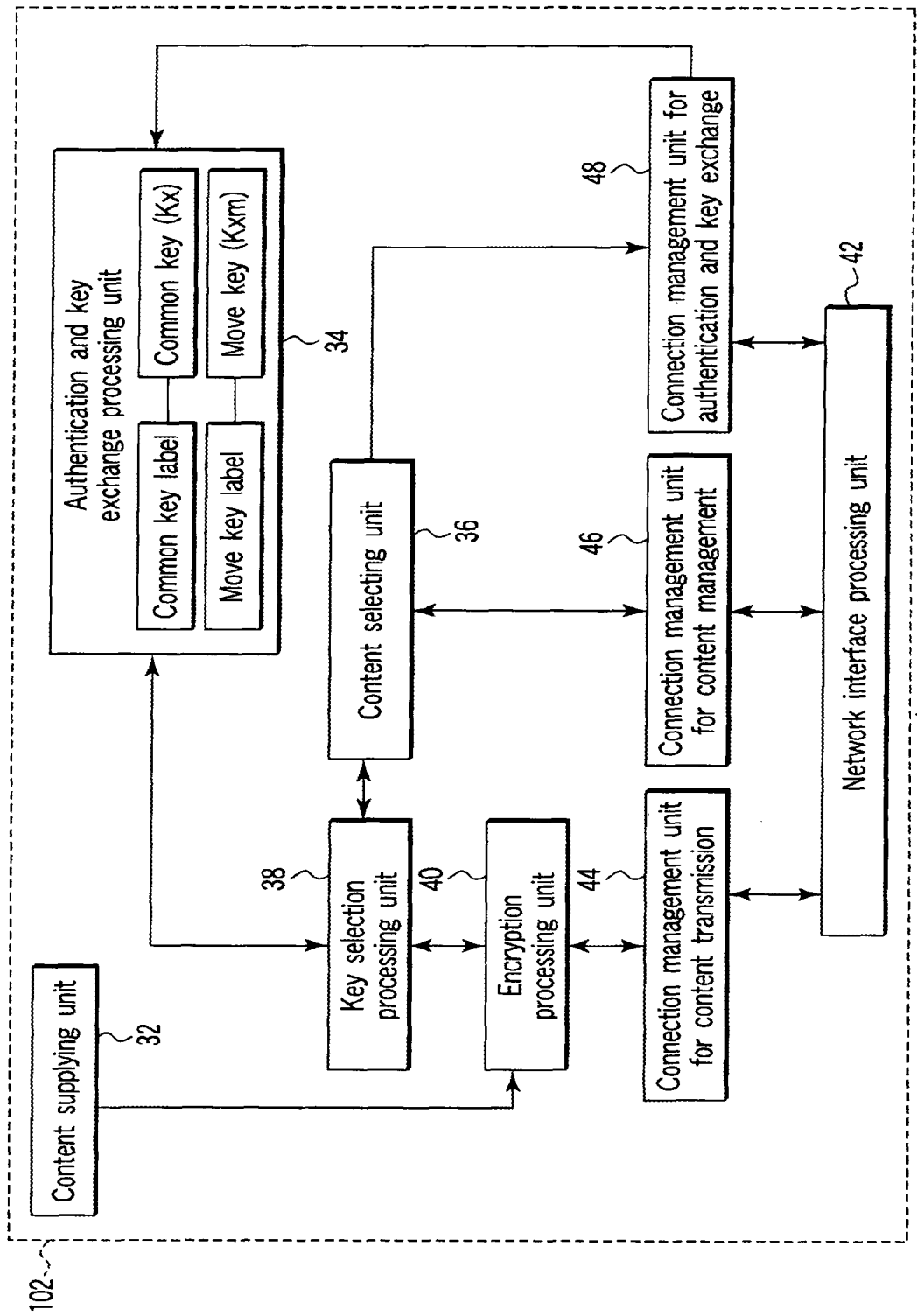
FIG. 3 is an exemplary block diagram depicting a schematic configuration of the receiver according to the first embodiment.

Various embodiments according to the invention will be described hereinafter with reference to the accompanying drawings. In general, according to one embodiment of the invention, a transmitting method for transmitting a content from a transmitter to at least one of receivers, the method comprises transmitting a start request for an authentication and key exchange from the at least one of receivers to the transmitter, performing an authentication and key exchange for at least one of a first key common to the receivers and a second key peculiar to the at least one of the receivers, and encrypting the content by using a key shared by the transmitter and the at least one of the receivers to transmit the encrypted content to the at least one of the receivers.

The embodiment relates to a content transmitting and receiving system which moves a content from the content transmitter (hereinafter referred to as transmitter) to a content receiver (hereinafter referred to as receiver), or conducts rendering/copying the contents. The moving makes the content void (erases) on a transmission side after transmitting the content, but the rendering/copying does not makes the content void. The copying makes a plurality of identical contents in a system. The rendering makes the receiver display the content stored in the transmitter, and plural identical contents do not exist in the system. Hereinafter, for convenience of explanation, purporting to be only rendering includes both copying and rendering.

The transmitter having stored the content is called a source. The receiver is called a sink. The first embodiment is an example to request moving or rendering of a content from the receiver to the transmitter side, and a user being present at the receiver side, the receiver and the transmitter are also referred to as a client and a server, respectively. The second embodiment is an example to request moving or rendering from the transmitter to the receiver side, and the user being present at the transmitter side, the transmitter and the receiver are also referred to as a client and a server, respectively.

First Embodiment

FIG. 1 is a block diagram illustrating a schematic configuration of a transmitter 100 according to the first embodiment. The transmitter 100, as shown in FIG. 1, comprises a content supplying unit 12, an authentication and key exchange processing unit 14, a content list management unit 16, a key selection processing unit 18, an encryption processing unit 20, a network interface processing unit 22, a connection management unit 24 for content transmission, a connection management unit 26 for content management, and a connection management unit 28 for an authentication and key exchange.

The content supplying unit 12 stores contents and a list thereof.

The authentication and key exchange processing unit 14 performs an authentication and a key exchange between the transmitter 100 and a receiver. The first embodiment, as shown in FIG. 2, allows existence of a plurality of receivers A, B and C (or D, and E) for one transmitter X (or Y). If authentication and key exchange have completed successfully with respect to the receivers, the authentication and key exchange processing unit 14 generates private keys encrypting contents to be transmitted to each receiver. In the first embodiment, using separate private keys encrypts the contents for the rendering and moving. Hereinafter, the private key used for encrypting a content for rendering is referred to as a common key Kx, and the private key used for encrypting the content for moving is referred to as a move key Kmx.

The key shared between the transmitter and the receiver encrypts the common key Kx and the move key Kmx generated by the authentication and key exchange processing unit 14 to transmit them to the receivers. The common key Kx and move key Kmx are put with a common key label and a move key label, respectively, to be stored in the authentication and key exchange processing unit 14. As mentioned below, a plurality of keys (common key and move key) having been allowed to exist, the common key label and the move key label are identification information to distinguish each key.

The transmitters share an identical common key Kx for all receivers which have completed successfully the authentication and key exchange processes. That is, only one common key Kx exists for each transmitter. From the point of view of communication efficiency, it is preferable for a model of a multicast or a broadcast to simultaneously deliver the identical contents from the transmitter to the plurality of receivers to encrypt the contents with the identical key. Accordingly, the transmitter transmits the identical common key Kx for the plurality of receivers.

On the other hand, the transmitter shares the move key Kxm differing from the common key Kx with each receiver. The transmitter may hold a plurality of move keys Kxms for each receiver if the transmitter moves the contents to a plurality of receivers.

Here, the authentication and key exchange process includes a process to generate a common key when the transmitters and receivers mutually authenticate that they are devices which are correctly licensed from a license agency and can confirm that they are responsible devices. As for a method of authentication, for instance, a heretofore known method, such as, ISO/IEC 9798-3 and ISO/IEC 9798-2 has been presented.

The content list management unit 16 manages a list of contents stored in the supplying unit 12, and presents a list of stored contents in response to a content retrieval request from the receiver.

The key selection processing unit 18 determines whether to encrypt the content with the common key Kx or with move key Kmx in response to the fact that the content request received form the receiver is a rendering request or a move request. The selection processing unit 18 selects an appropriate key from among keys, stored in the authentication and key exchange processing unit 14 and shared with the receiver, to supply it to the encryption processing unit 20.

The encryption processing unit 20 encrypts the content by using the key supplied from the selection processing unit 18. A commonly known method, such as an AES, is presented as an encryption algorithm to encrypt and decrypt data.

The network interface processing unit 22 executes a physical layer process, a data link layer process, and a network layer/transport layer process to make communications with the receiver. The physical layer and the link layer may assume various forms such as a wireless LAN compliant with IEEE 802.11, Ethernet (registered trade mark), and IEEE 1394. The network layer may be IPv4 or IPv6 when Internet protocol (hereinafter referred to as IP merely) is put in use.

The connection management unit 24 for content transmission manages a connection for a content transmission. The connection management unit 26 for content management presents a content list in response to a request from the receiver, and manages a connection to present a URL of the content. A method for presenting the content list to the receiver utilizes, for instance, a protocol such as a universal plug and play (UPnP). As for a means for displaying a location of a content, for example, a URL is used.

The connection management unit 28 for authentication and key exchange manages a connection for an authentication and key exchange.

FIG. 3 is a block diagram illustrating a schematic configuration of the receiver 102 in the first embodiment. The receiver 102, as shown in FIG. 3, has a content processing unit 32, an authentication and key exchange unit 34, a content selecting unit 36, a key selection processing unit 38, an encryption processing unit 40, a network interface unit 42, a connection management unit 44 for content transmission, a connection management unit 46 for content management; and a connection management unit 48 for authentication and key exchange.

The network interface processing unit 42, connection management unit 44 for content transmission, connection management unit 46 for content management and management unit 48 for authentication and key exchange each have the same function as those of the corresponding blocks in the transmitter, and may be configured by means of similar blocks, respectively.

The content processing unit 32 outputs the received content to a display device, etc., and stores the content in a not shown storage unit.

The authentication and key exchange processing unit 34 performs an authentication and key exchange process between the transmitter 100 and the receiver 102. If the authentication and key exchange have completed successfully, the authentication and key exchange processing unit 34 receives the common key Kx and move key Kxm that are the private keys to be used for decrypting the content from the transmitter and labels to store them therein.

The content selecting unit 36 communicates with the transmitter 100, retrieves the contents stored in the content supplying unit 12 of the transmitter 100, and manages the list of the retrieval result and the locations of the respective contents on the network. Means for acquiring the list of the contents stored in the transmitter 100 from the transmitter or the equipment on the network includes a means, such as a UPnP. For a means for specifying the locations of the contents on the network, for instance, a means such as a URL is used. The contents for moving and for rendering may be distinguished with URL, respectively.

The key selection processing unit 38 determines whether the content request from the content selecting unit 36 is the move request or the rendering request, and if it is the move request, the selection processing unit 18 transmits a content request to the transmitter with specifying a move key label. On the contrary, if it is the rendering request, it transmits the content request without labeling anything. That is, in acquiring the content from the transmitter, the selection processing unit 38 acquires the URL of the corresponding content from the content selecting unit 36, transmits a GET request, for example, through an HTTP protocol to the corresponding URL, and acquires the content from the transmitter.

The encryption processing unit 40 decrypts the content through use of the common key or the move key.

FIG. 4 is a sequence view depicting a process procedure of a content transmitting and receiving system according to the first embodiment. In the embodiment, three communication connections A, B and C are disposed between the transmitter 100 and the receiver 102. The connection A is used for content management, the connection B is used for an authentication and key exchange, and the connection C is used for a content transmission.

The receiver 102 firstly requests the content retrieval by using the connection A (#2). Before this content retrieval, in retrieving an IP address of the transmitter 100 on the network, or specifying a transmission destination IP address or a port number of a message to conduct the content retrieval, a well known method such as the UPnP is utilized.

The transmitter 100 presents the list of the contents and the URLs thereof as the results of the content retrieval (#4). At this moment, if the transmitter 100 distinguishes the content for moving and content for rendering by URL, the receiver 102 may come to know movable content.

For the protocol of the content retrieval, a method defined in a UPnP content directory service (UPnP CDS) may be available. The IP address and TCP port number of the transmitter aimed to make the receiver and transmitter conduct the authentication and key exchange therebetween may be added as additional information of the URLs indicating the locations of the contents. In presenting the list of the contents to the receiver 102, the transmitter 100 may list the address for rendering and the address for moving by distinguishing them from each other. Means for distinguishing the address for moving and the address for rendering may include (a) a method for adding additional information indicating the fact of the address for moving to the address of the content, (b) a method for labeling a move key label to the address of the content.

The receiver 102 selects a desired content from the list of contents. Here, it is presumed that the receiver 102 selects the content for moving. The receiver 102 obtains the address and port number of the transmitter 100 to conduct the authentication and key exchange process from the additional information of the location of the content to request a start of an authentication and key exchange process for moving to the transmitter 100 by using the connection B (#6). If the authentication and key exchange process has completed successfully, the transmitter 100 generates the common key Kx and move key Kxm that are the private keys used for encrypting the contents between the transmitter and each of the receivers to transmit the keys KX and Kxm to the receivers together with the label information (#8).

To assure security, it is preferable for the authentication and key exchange processing unit 34 to generate different values as the move key Kxm for each time, and transmit the generated move key Kxm only one time on the network regardless of whether the receivers are the same ones.

When the authentication and key exchange can confirm that the receivers are the same as those which performed the authentication and key exchange processes previously, the authentication and key exchange processing unit 34 may transmit the identical move key Kxm, but it is important not to transfer the identical move key Kxm to different receivers. Thereby, the contents encrypted with the move key Kxm can be assured to be encrypted only by one of the receivers.

For instance, when the transmitter X shown in FIG. 2 receives a move request of a content "a" from a receiver A and receives a rendering request of a content "b" from a receiver B, the transmitter X encrypts the content "a" by using a move key Kxm1 transmitted to the receiver A to transmit the encrypted content "a" thereto, and encrypts the content "b" by using the move key Kxm1 transmitted to the receiver B to transmit the encrypted content "b" thereto.

The transmissions in this manner sometimes makes the content "b" for rendering to be decrypted in the case in which the receivers A and C having the common key Kx1 other than the receiver B receive the corresponding content by some kind or another means. The receiver A with the move key Kxm1 can decrypt the content "a" for moving, but the receivers B and C with no move key Kxm1 cannot decrypt it although they can receive it. Therefore, it is prevented for the content "a" to be moved from being decrypted by two or more of the receivers.

In addition, the transmitter 100 being possible to simultaneously accept the rendering request and the move request for the different contents, it can improve both the security and the usability of the user. Even when the transmitter 100 receives the move requests of different contents from a plurality of receivers, since individual contents may only be encrypted with keys transmitted to each of the receivers 102, a plurality of moving transmissions can be achieved simultaneously.

Move key labels each include label information corresponding to each move key Kxm, they are used for distinguishing each move key when the transmitter (for instance, transmitter X in FIG. 2) has a plurality of move keys (for instance, Kxm1, Kxm2 and Kxm3) determining that which transmitter should exchange the authentication and key for moving, which move key is held, and which move key should be used for decryption when the receiver 102 moves the contents from a plurality of transmitters 100. The transmitter 100 transmits the move key Kmx by encrypting with the common key Kx in the authentication and key exchange process, but the move key label itself not being a secret value, the move key may be transmitted as a plain text.

For example, the following examples are thought as means for the receiver 102 to request the move key Kxm to the transmitter 100.

(1) In addition to the authentication and key exchange request for receiving the common key (FIG. 5A), the receiver 102 requests the authentication and key exchange for receiving the move key (FIG. 5B).

(2) After requesting the authentication and key exchange for receiving the common key and receiving the common key once, the receiver 102 transmits the move key request to the transmitter 100 and receives the move key encrypted with the same key as that encrypts the common key (FIG. 6A).

(3) The transmitter 100 transmits both the common key and the move key on the basis of the authentication and key exchange request for receiving the common key (FIG. 6B).

Taking compatibility with a receiver capable of receiving only the common key and a transmitter without a function of transmitting the move key into account, the receiver 102 and the transmitter 100 may confirm mutual functions in advance, before the receiver 102 transmits the move key request in the case of FIG. 6A, and before the transmitter 100 transmits the common key and move key in the case of FIG. 6B.

In the case in which it becomes clear that the receiver 102 has already performed the authentication and key exchange with the transmitter 100 to obtain the move key Kxm by determining from the IP address, etc., of the transmitter 100, the process of the authentication and key exchange of the move key Kxm may be skipped. In such a case, to confirm whether or not the transmitter 100 has owned the move key possessed by the receiver 102, before making the content request, the receiver 102 may inquire to the transmitter 100. In this case, the inquiry includes the move key label, and the transmitter 100 retrieves whether or not the move key label is stored in its own unit and may return the retrieved result to the receiver 102.

Returning now to FIG. 4, when the receiver 102 receives the move key Kxm and the move key label, the receiver 102 transmits the move request of the content to the transmitter 100 by using the connection C (#10). The move request includes the move key labels indicating which move key makes the contents encrypted to be receivable by the corresponding receiver. An example of the move request (GET request) in the HTTP protocol is shown as follows. The fifth line shows the move key label.

Content-Type: application/x-dtcp1;
DTCP1HOST=<host>;
DTCP1PORT=<port>;
CONTENTFORMAT=<mimetype>;
DTCPKXM=<exchange_key_label>

The transmitter 100 checks the move key labels included in the move request, determines which move key has to be used for encrypting the content, and encrypts the content by using the move key matching to the move key label to transmit the encrypted content to the receiver 102 (#12).

Figure 7:
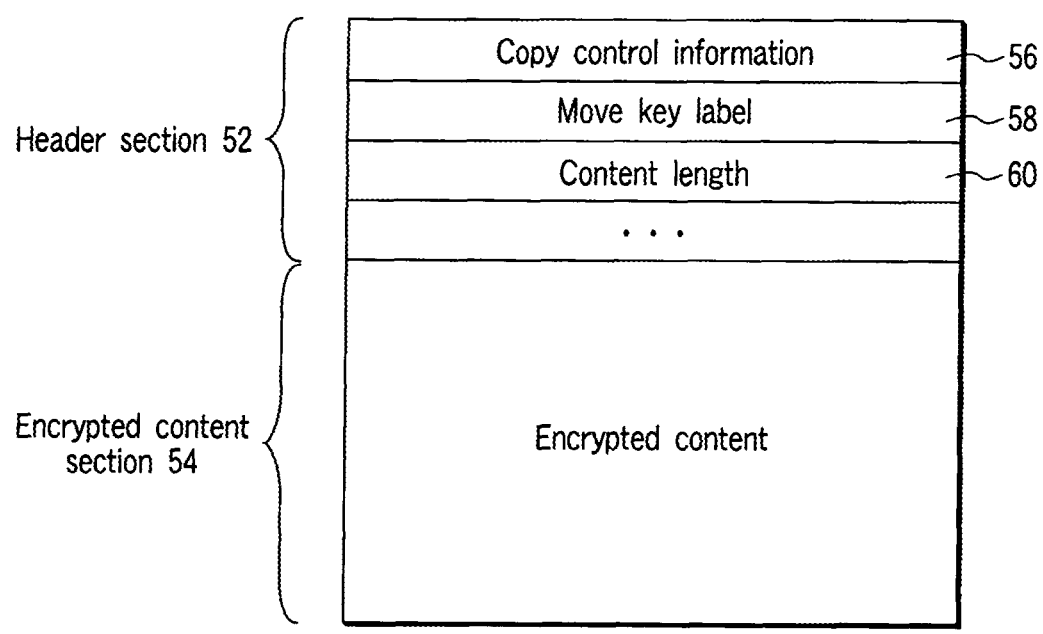
FIG. 7 is an exemplary view depicting an example of a transfer format when the transmitter transfers an encrypted content to the receiver.

FIG. 7 depicts a format of the content to be transmitted. The content is transmitted in a pack form including a header section 52 and an encrypted content section 54. The header section 52 includes a move key label 58. Other than this, the header section 52 may include content copy control information 56 related to copy-inhibition, copy-permission only for one generation, moving, move/copy-permission, etc., information related to a length (content length) 60 of the content section before encryption, and so on.

If there is not move key specified from the receiver 102 in the transmitter 100, the transmitter 100 does not transmit a content and returns an error. Other than this move key label, the receiver 102 may adds the additional information, to be transmitted to the transmitter 100, to the control request, wherein the additional information distinguishes whether the content request is the move request or the rendering request. The additional information may be an argument of the URL, and a request header may be newly defined to be inserted as its parameter.

After completing the transmission of contents, the transmitter 100 deletes the moving-transmitted content or brings it into a state of being disabled for use (invalid).

When receiving the encrypted contents, the receiver 102 compares the move key label 58 included in the header section 52 of the content with the move key label stored in the authentication and key exchange processing unit 34, and if their values coincide with each other, the receiver 102 starts content-decryption. If they do not coincide with each other, the receiver 102 suspends receiving the content. Differing the values of the move key labels from each another means that the value of the move key used for encrypting the content by the transmitter 100 differs from the value of the move key owned by the receiver 102. In the case of moving, the transmitter 100 deleting the content or bringing the content into a use-impossible state (invalid), if the receiver 102 cannot decrypt the content correctly, the content is disappeared. To avoid this situation, the move key label 58 is inserted into the header section 52 of the content to determine whether or not the receiver 102 can decrypt the content correctly.

In stead of determining whether the content is one possible to be decrypted on the basis of the move key label 58 included in the header section 52 of the content received by the receiver 102, the transmitter 100 may transmit a content response to respond to the content request before transmitting the content, and may include the move key label in its content response. In this case, the receiver 102 determines whether or not the move key label in the content response coincides with the move key label owned by its own unit. If the content request has been made in the GET request of the HTTP protocol, the move key label may be included in an HTTP response header.

As described above, the receiver 102 is capable of determining whether the content can be decrypted by means of the content response. If the content is one impossible to be received, the receiver 102 disconnects the connection before receiving the content and the transmitter 100 is possible to disconnect the connection before transmitting the content. Thus, an useless transmission may be avoided and disappearing the content can be prevented.

FIG. 8 is a flowchart depicting an operation procedure of the transmitter 100. The first embodiment is a model in which the receiver 102 selects which content in the transmitter 100 should be moved. The transmitter 100 firstly receives the content retrieval request from the receiver 102 through the connection A (S2), and transmits the content list as its response (S4).

After this, the transmitter 100 receives the authentication and key exchange request for moving through the connection B from the receiver 102 (S6), conducts the authentication and key exchange process with respect to the receiver 102. The transmitter 100 determines whether or not the authentication and key exchange process has succeeded in S8. If the authentication and key exchange has failed, the transmitter 100 performs an error process (transmit a message notifying the fact to receiver 100) (S10), and does not conduct any process after this.

When the authentication and key exchange has succeeded, the transmitter 100 encrypts the move key by using the key shared by the receiver 102 through the authentication and key exchange, and transmits the encrypted move key to the receiver 102 through the connection B with being labeled (S12).

After this, the transmitter 100 receives the move request (including move key label) to move the content from the receiver 102 though the connection C (S14), and retrieves whether or not the move key specified by the move key label included in the move request is present in its own unit (S16).

If the move key specified by the move key label included in the move request does not present in its own unit, the transmitter 100 performs an error process (transmits message notifying the fact to receiver 102) (S10) and does not transmits the content.

If the specified move key is present in its own unit, the transmitter 100 encrypts the content by using the move key (S20), and transmits the encrypted content through the connection C to the receiver 102 (S22).

FIG. 9 is a flowchart illustrating an operation procedure of the receiver 102. The receiver 102 transmits a content retrieval request to the transmitter 100 through the connection A (S32), and receives a content list (S34) transmitted as its response from the transmitter (S4 in FIG. 8).

After then, the receiver 102 transmits an authentication and key exchange request for moving to the transmitter 100 through the connection B (S36), and starts the authentication and key exchange process. The receiver 102 determines whether or not the authentication and key exchange process has succeeded in S38. If it is determined that the authentication and key exchange process has failed, the receiver 102 conducts an error process (transmits message notifying the fact to transmitter 100) (S40), and does not conduct any subsequent process.

When the authentication and key exchange has succeeded, the receiver 102 receives the encrypted move key and the move key label transmitted from the transmitter 100 (S12 in FIG. 8) through the connection B (S42). The receiver 102 decrypts the received encrypted move key by using the key shared though the authentication and key exchange to store the decrypted move key together with the move key label.

Next, the receiver 102 selects a moving target content from among the content list (S44), and transmits the move request together with the move key label corresponding to the move key shared with the transmitter 100 thereto though the connection C (S46). The receiver 102 then receives the encrypted content as the response for the move request (S48) transmitted from the transmitter 100 (S22 in FIG. 8), and confirms whether or not the move key label included in the header section 52 of the content coincides with the move key label possessed by its own unit (S50).

If the move key label included in the header section 52 does not coincide with the move key label owned by its own unit, the receiver 102 disconnects a connection for receiving content (S52), performs (S40) an error process (transmits message notifying the fact to transmitter 100), and does not proceed the following processes.

When the move key label coincides with the move key label possessed in its own unit, the receiver 102 uses the move key possessed in its own unit to decrypt the encrypted content received from the transmitter 100 through the connection C (S54).

As described above, according to the first embodiment, the content transmitting/receiving system distinguishes the rendering key from the move key to distribute the identical rendering key to a plurality of receivers, but to distribute different move keys to the receivers, so that the system can surely prevent illegal use of a content, also perform moving and rendering at the same time, and achieve effective use of the content. In addition, the transmitter distributes the identical key only one time, the system can improve security.

That is to say, on moving the content, the system becomes possible to limit the number of the receivable receivers to one, and also the transmitter becomes possible to transmit other contents to other receivers during moving a certain content. Therefore, the system can achieve effective use of the content as well as it can surely prevent the illegal use of the content.

The system connects and uses separately the connections for content transmitting/receiving, content managing, and key transmitting/receiving. Therefore, the security in transmission to and from the transmitter and receiver is kept high.

The receiver determines whether or not it stores the move key necessary for decrypting the content before receiving the content to move, and if it does not store the move key, it stop receiving the content. The transmitter deletes or disables the content after transmitting it. Therefore, the system can prevent the disappearance of content which has been moved erroneously.

Further, the transmitter transmits the key and key label to specify the key to the receiver, and the transmitter encrypts the content by using the key when the receiver made a request for specifying the key by the key label. Therefore, the whole of the system can allow the existence of a plurality of keys, increase use aspects of the content, and results in achieving effective use of the content.

Second Embodiment

The first embodiment is a model in which the receiver transmits the request in order to move and transmit the content to the transmitter side. A second embodiment is a model in which the transmitter requests so that the receiver receives the moved content.

Figure 10:
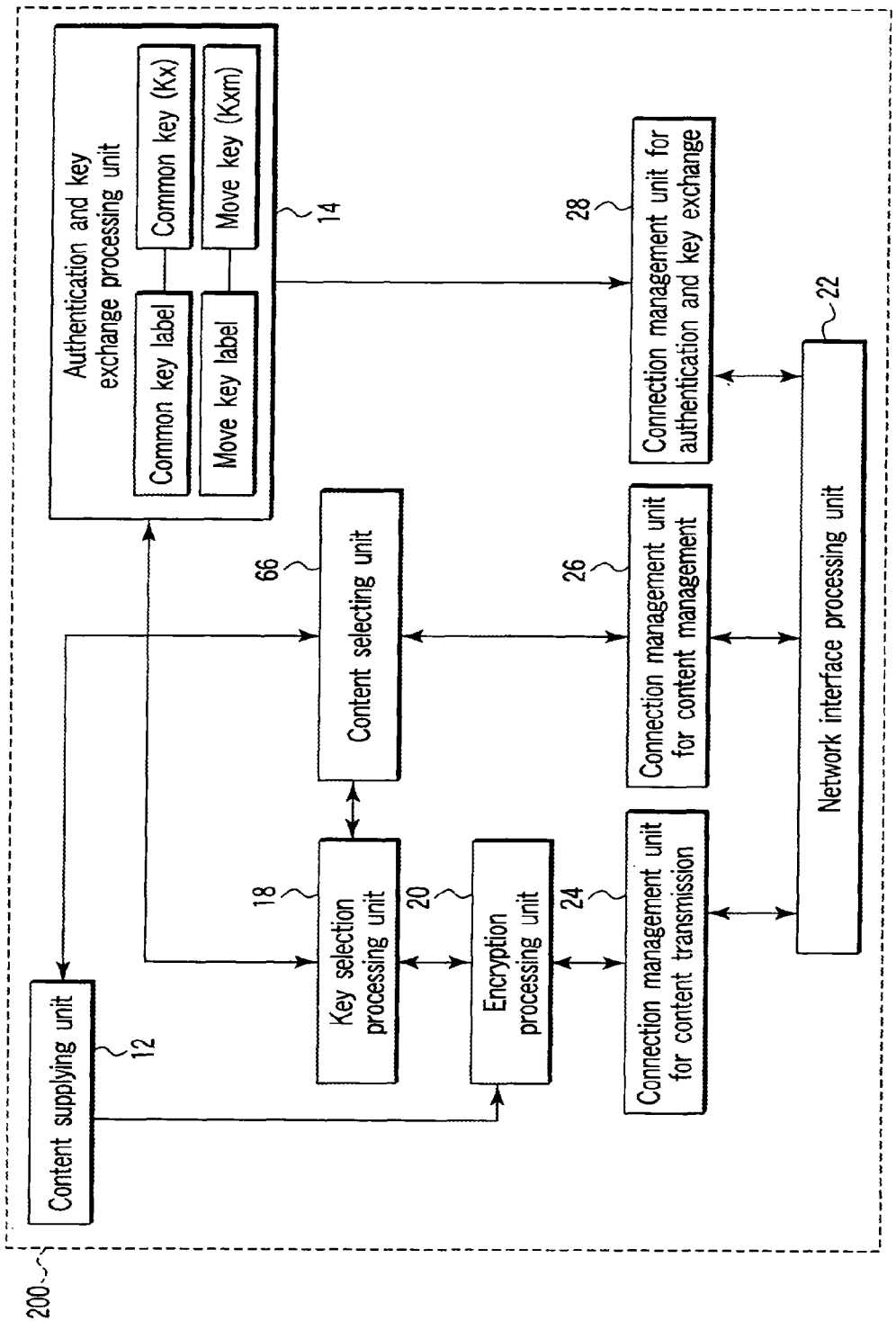
FIG. 10 is an exemplary block diagram depicting a schematic configuration of a transmitter regarding a second embodiment.

FIG. 10 is a block diagram illustrating a schematic configuration of a transmitter 200 according to the second embodiment. The transmitter 200, as shown in FIG. 10, comprises the content supplying unit 12, authentication and key exchange processing unit 14, a content selecting unit 66, the key selection processing unit 18, encryption processing unit 20, network interface processing unit 22, connection management unit 24 for content transmission, connection management unit 26 for content management, and connection management unit 28 for authentication and key exchange.

The content supplying unit 12, authentication and key exchange processing unit 14, encryption processing unit 20, network interface processing unit 22, connection management unit 24, connection management unit 26, and connection management unit 28 have the same functions and configurations as those of FIG. 1.

The content selecting unit 66 has a function to specify the content to move, and a function to transmit a message to instruct a receiver so as to prepare for receiving a content.

FIG. 11 is a block diagram illustrating a schematic configuration of a receiver 202 according to the second embodiment. The receiver 202, as shown in FIG. 11, includes the content processing unit 32, authentication and key exchange processing unit 34, a content storing management unit 68, the key selection processing unit 38, encryption processing unit 40, network interface unit 42, connection management unit 44 for content transmission, connection management unit 46 for content management, and connection management unit 48 for authentication and key exchange.

The content processing unit 32, authentication and key exchange processing unit 34, encryption processing unit 40, network interface processing unit 42, connection management unit 44, connection management unit 46, and connection management unit 48 have the similar functions and configurations to those of FIG. 3.

The content storing management unit 68 has a function to receive a message instructing so as to prepare for receiving a content from the transmitter 200, and a function to transmit a URL for storing the content as its response to the transmitter 200.

Figure 12:
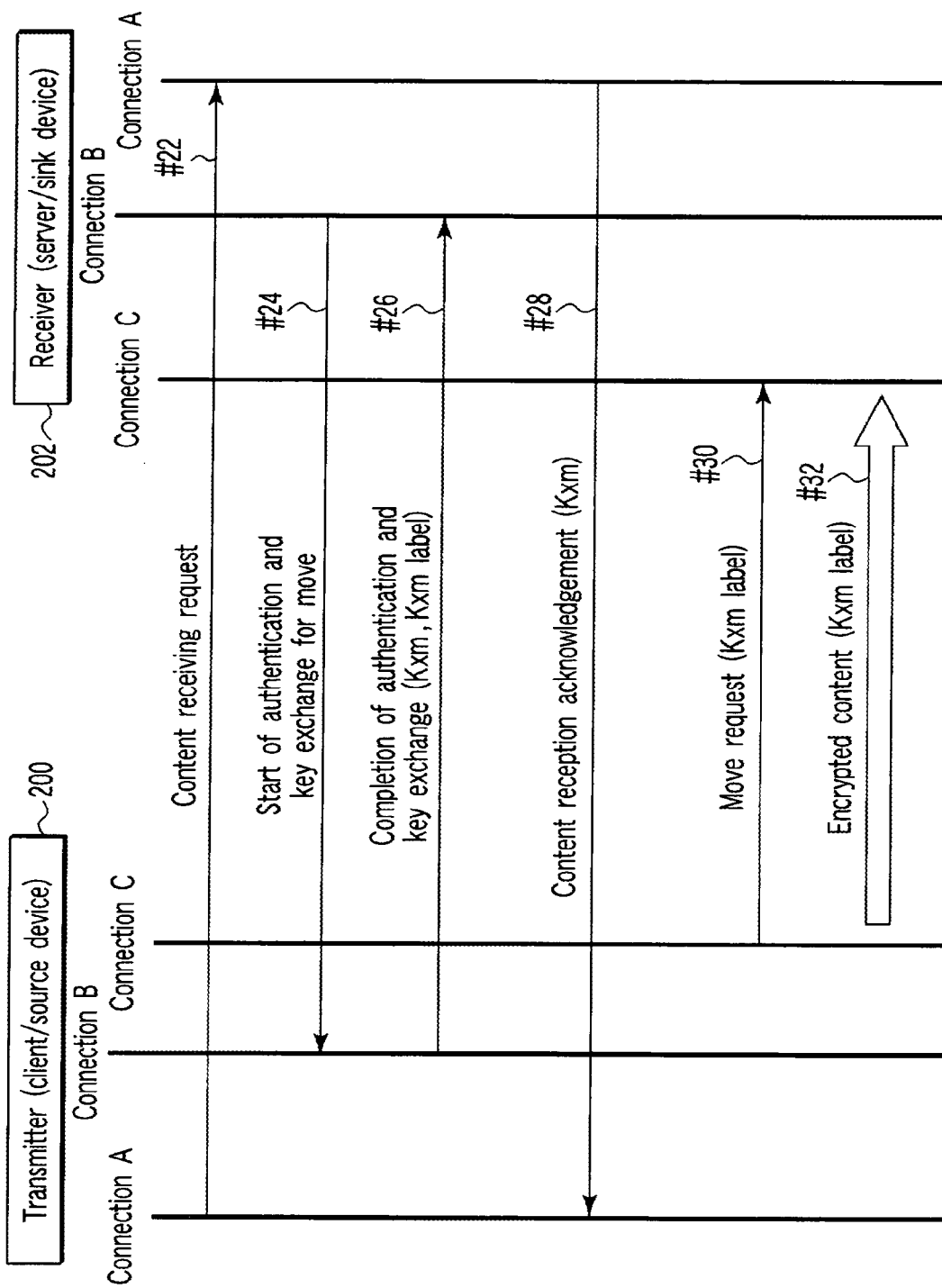
FIG. 12 is an exemplary flowchart depicting a whole process procedure of a content transmitting and receiving system according to the second embodiment.

FIG. 12 is a flowchart illustrating a process (here, moving process) procedure of a content transmitting/receiving system according to the second embodiment. Even in the second embodiment, three communication connections A, B and C are disposed between the transmitter 200 and the receiver 202, the connection A is used for content management, the connection B is used for an authentication and key exchange, and the connection C is used for a content transmission.

Differing from the first embodiment, in the second embodiment, at first, the transmitter 200 transmits a message (content receiving request) to instruct the receiver 202 so as to receive a content though the connection A (#22). The message may include information indicating that the data to be transmitted is an encrypted content, and information indicating the type of a content before encryption, such as, an IP address, TCP port number, and MIME-Type of the transmitter so that the receiver 202 and the transmitter 200 conducts the authentication and key exchange therebetween. Earlier than the transmission of this message, a means for retrieving receivers from a network, and a well known method, such as, UPnP for deciding the IP address and port number to transmit the message are used. To transmit a message instructing to receive a content, for instance, the following Create Object message in the protocol of the UPnP.

Content-Type: application/x-dtcp1;
DTCP1HOST=<host>;
 DTCP1PORT=<port>;
 CONTENTFORMAT=<mimetype>;
 DTCOKXM=NULL Next, the receiver 202 requests to start an authentication and key exchange process for moving to the transmitter 200 by means of the connection B (#24). After succeeding the authentication and key exchange process, the transmitter 200 generates a common key Kx and a move key Kmx that are private keys for use in encrypting contents to and from the receiver 202 to transmit them to the receiver 202 (#26). In the similar way of the first embodiment, the transmitter 200 also transmits move key label information to distinguish the move key at the same time of transmitting the move key. In the case of the failure of the authentication and key exchange process, the transmitter 202 conducts an error process and does not conduct the following processes.

After completing the authentication and key exchange, the receiver 202 returns a content reception acknowledgement message showing the completion of preparing to receive the content to the transmitter 200 through the connection B (#28). At this moment, the receiver 202 includes in the content reception acknowledgement message address information showing which of the addresses the transmitter 200 should return the content to, and the move key label received by the receiver 202 from transmitter 200 as a result of the authentication and key exchange process. The address information may indicate, for example, in a URL form. One example of a returning message is shown as follows:

<service>://<host>:<port>/<path>/<FileName>.<FileExtention>?CONTENTPROTECTIONTYPE=
DTCP1&DTCPKXM=<exchange_key_label>

After this, the transmitter 200 starts a transmission of a content to an address specified with a content reception acknowledgement message (#30, #32). The transmitter 200 brings the transmitted content into a sate of deleting it or a state of disabling it. For the key to use in encrypting the content, the transmitter 200 uses the move key corresponding to the move key label included in the acknowledgement message.

If the move key corresponding to the move key label included in the acknowledgement message is not present, the transmitter 200 transmits an error message to the receiver 202. For the form of the content, the format shown in FIG. 7 is available. That is, the transmitter 200 sets the move key label 58 in the header section 52 of the content, and encrypts it with the move key corresponding to the move key label 58.

To transmit the content, the transmitter 200 uses a POST request of the HTTP protocol. At this moment, the transmitter 200 may set the move key label in the POST request to transmit it as HTTP header information. One example of the POST request is shown as follows:

Content-Type: application/x-dtcp1;
DTCP1HOST=<host>;
 DTCP1PORT=<port>;
 CONTENTFORMAT=<mimetype>;
 DTCOMM=<exchange_key_label>

The receiver 202 compares whether the value of the move key label defined by the header section 52 of the content or by the HTTP header in the POST request coincides with the value of the move key label transmitted from the transmitter 200 and stored in its own unit as an authentication and key exchange process result. In the case of coincidence, the receiver 202 decrypts the content with the move key corresponding to the move key label. In the case of non-coincidence, the receiver 202 suspends receiving the content to disconnect the connection C for content transmitting/receiving.

The case of difference in the value of the move key label includes the case in which the value of the move key which has used for encrypting the content by the transmitter 200 differs from the value of the move key possessed by the receiver 202. To avoid the disappearance of the content due to the difference between the encryption key and the decryption key of the content in the similar way of the first embodiment, the receiver 202 may avoid the disappearance of the content carelessly by confirming that both keys coincide with each other in the use of the move key labels.

In the second embodiment, the transmitter 200 performs the process to select the content to be moved. It is desirable, from a view point of a user interface, for a selection right of the content to be moved to belong to a side storing the content, namely, to a transmitter side. In a conventional method, a receiver starts an authentication and key exchange, and a transmitter cannot start the exchange. However, in the second embodiment, while keeping the right to select the content to be moved at the transmitter side, starting the authentication and key exchange process depending on the content receiving request as a trigger by a receiver side solves the problem. Further, preventing the content impossible to be decrypted from being moved in the use of the move key label enables preventing the careless disappearance of the content.

FIG. 13 is a flowchart depicting an operation procedure of the transmitter 200. In the second embodiment, because it is a model in which the transmitter 200 selects which of the contents in its own unit has to be moved, the transmitter 200 selects a content to be moved (S52).

After this, to instruct the receiver 202 so as to prepare receiving the content, the transmitter 200 transmits the content receiving request through the connection A (S54). The transmitter 200 then receives the authentication and key exchange request transmitted from the receiver 202 (S56) to conduct the authentication and key exchange process with regard to the receiver 202. Like this, by starting the authentication and key exchange process just after transmitting the content receiving request (before transmitting content reception acknowledgement), the transmitter 200 can transmit the move request and encrypted content just after receiving the content reception acknowledgement, and start transmitting the content without needing a waiting time (authentication and key exchange).

The transmitter 200 determines whether or not the authentication and key exchange process has succeeded in S58. If the authentication and key exchange process has completed unsuccessfully, the transmitter 200 conducts an error process (transmits a message notifying the fact to the receiver 202) (S60) then does not perform any following process.

Otherwise stated, the transmitter 200 generates the move key which has been encrypted by using the key shared in the authentication and key exchange, labels the move key label on the encrypted move key, and transmits the encrypted and labeled move key to the receiver 202 through the connection B (S62).

After this, the transmitter 200 receives the content reception acknowledgement as a response message corresponding to the content receiving request from the receiver 202 (S64). The response message includes address information of a destination (of connection C) to transmit the content and the move key label possessed by the receiver 202. The transmitter 200 retrieves whether or not the move key, specified with the move key label included in its response message, is present in its own unit (S66).

If the retrieval completed unsuccessfully (S68), the transmitter 200 transmits the message notifying the fact to the receiver 202, conducts an error process (transmit a message notifying the fact to the receiver 202) (S60), and does not transmit the content. Otherwise stated, the transmitter 200 encrypts the content with its move key (S70) to transmit the encrypted content to the receiver 202 (S72).

Figure 14:
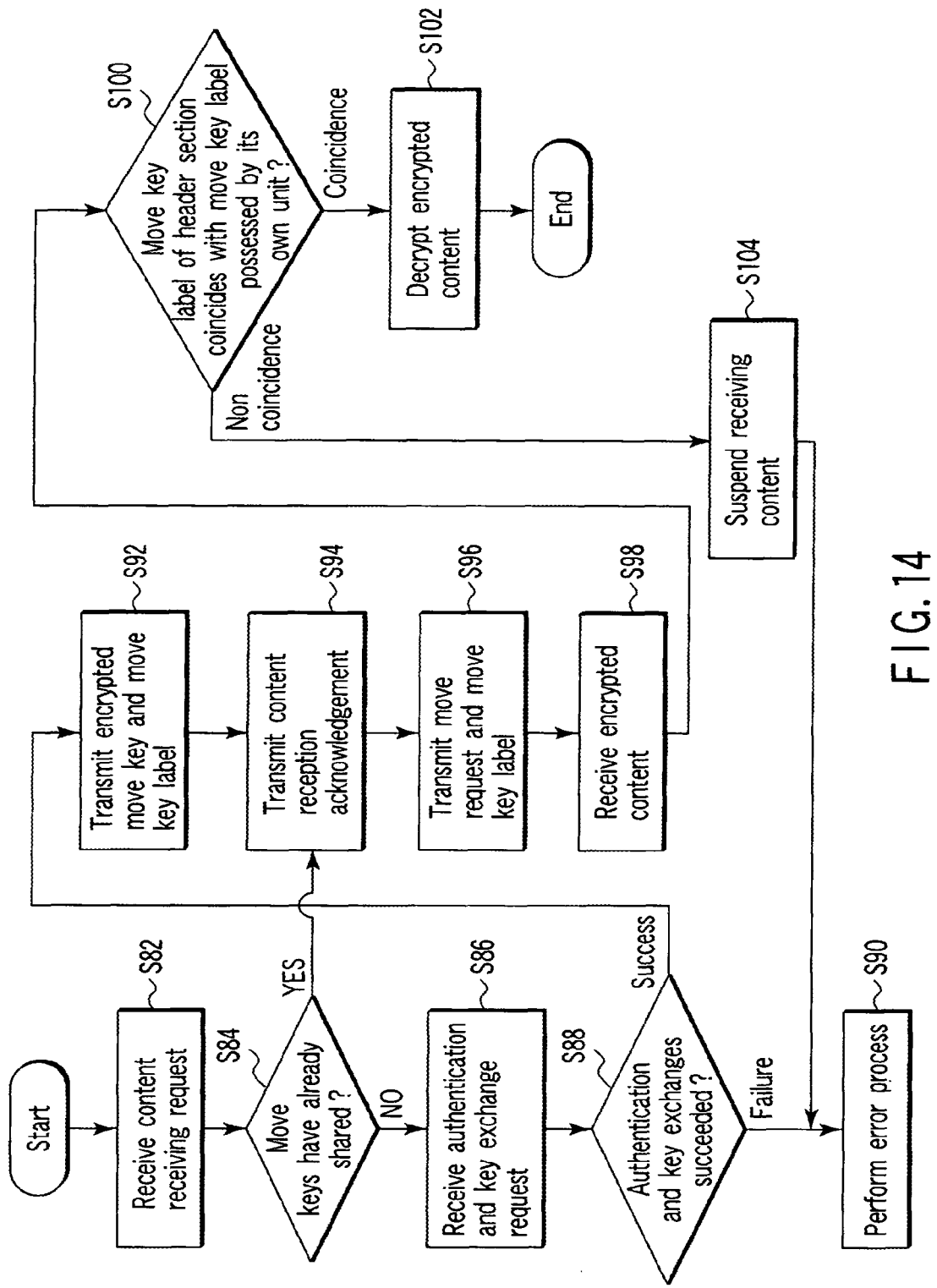
FIG. 14 is an exemplary view depicting an example of a flowchart of a receiver according to the second embodiment.

FIG. 14 is a flowchart depicting an operation procedure in the receiver 202. The receiver 202 receives the content receiving request, transmitted from the transmitter 200 (S54 in FIG. 13), through the connection A (S82). The receiver 202 determines whether or not it has already shared the move key with the transmitter 200 (S84).

If the receiver 202 has already shared the move key with the transmitter 200, the receiver 202 transmits the content reception acknowledgement as the response message for the content receiving request (S94). If the receiver 202 has not shared the move key with the transmitter 200, the receiver 202 transmits the authentication and key exchange request through the connection B (S86) to start the authentication and key exchange process.

The receiver 202 determines whether or not the authentication and key exchange process has succeeded (S88). If the authentication and key exchange process has not succeeded, the receiver 202 performs the error process (transmit a message notifying the fact to the transmitter 200) (S90) then does not perform subsequent processes.

If the authentication and key exchange has succeeded, the receiver 202 receives the encrypted move key and the move key label, transmitted from the transmitter 200 (S62 in FIG. 13), through the connection B (S92). The receiver 202 decrypts the encrypted move key by using the common key shared in the authentication and key exchange to store the move key together with the move key label in the authentication and key exchange processing unit 34.

The receiver 202 then transmits the content reception acknowledgement as the response message for the content receiving request (S94). Next to this, the receiver 202 receives the move request, for the address indicated in the content reception acknowledgement, from the transmitter 200 (S96). The move request includes the move key label. The receiver 202 confirms whether or not this move key label, or the move key label including in the header section 52 of the content followed by the content move request and received coincides with the move key label possessed by its own unit (S100). If those move key labels do not coincide with the move key label possessed by its own unit, the content cannot being decrypted, to suspend the moving, the receiver 202 disconnects the connection C for content receiving to suspend receiving the content (S104), conducts the error process (S90), and does not progress to the sequence processes. Otherwise stated, the receiver 202 decrypts the content through the use of the move key (S102).

As mentioned above, by starting the authentication and key exchange process by the receiver, by the use of the content receiving request from the transmitter as a trigger, in addition to the effects of the first embodiment, the second embodiment produces satisfactory results that it may grant the selection right of the content to the transmitter storing the content and make the transmitter be a client. After transmitting the content receiving request, starting the authentication and key exchange and receiving the content reception acknowledgement after completing the authentication and key exchange without having to wait the acknowledgement of the transmission of the content receiving request enables the transmitter to transmit the move request and encrypted content immediately after the reception of the content reception acknowledgement and start the transmission of the content without any waiting time (authentication and key exchange).

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The transmitter and receiver given in the first and second embodiments may be configured by hardware, or software. When constituting them in software, a program achieving at least a part of functions of an information processing unit may be stored in a recording medium, such as a floppy disk and a CD-ROM, and read in a computer to run it. The recording medium is not limited to a portable one, such as a magnetic disk and an optical disk, and it may be a fixed-type recording medium, such as a hard disk drive and a memory. Program achieving at least a part of functions of the transmitter and receiver may be distributed via a communication line (also including wireless communication), such as the Internet. Further, in a state in which such a program is encrypted, modulated, and compressed, the program may be distributed via a cable line or radio line, such as the Internet, or distributed by storing it in a recording medium. When the rendering request occurs, the foregoing operation concerned with the moving may be read as the meaning of the operation for the rendering.

What is claimed is:

1. A transmitting method for transmitting a content from a transmitter to a first receiver, the method comprising:
   transmitting a content receiving request from the transmitter to the first receiver;
   transmitting, from the first receiver, a start request for an authentication and key exchange, the start request comprising one of a first request for generating a first key for rendering or copying a content and a second request for generating a second key for moving a content, the first key being common to the first receiver and a second receiver, and the second key being unique to the first receiver;

performing one of a first authentication and key exchange and a second authentication and key exchange, the first authentication and key exchange being triggered by the first request and performed between the transmitter and the first receiver in order to generate the first key, the second authentication and key exchange being triggered by the second request and performed between the transmitter and the first receiver in order to generate the second key, the generated first key and second key being shared by the first receiver and the transmitter;

transmitting, from the first receiver to the transmitter, an acknowledgement including a label of one of the first key and the second key;

encrypting the content by using the one of the first key and the second key based on the label included in the acknowledgement; and transmitting the encrypted content to the first receiver, wherein the moving makes the content void at the transmitter after transmitting, and the rendering or copying does not make the content void at the transmitter after the transmitting.

2. The method of claim 1, further comprising:
transmitting from the transmitter to the first receiver an error message if a key corresponding to the label included in the acknowledgement is not present in the transmitter.

3. The method of claim 2, further comprising:
notifying completion of the one of the first authentication and key exchange and the second authentication and key exchange from the transmitter to the first receiver.

4. A transmitter which transmits a content to a first receiver, comprising:
a first unit configured to transmit a content receiving request to the first receiver;
a second unit configured to perform one of a first authentication and key exchange and a second authentication and key exchange, the first authentication and key exchange triggered based on a first request transmitted from the first receiver, for a first key common to the first receiver and a second receiver when a content is to be rendered or copied, and the second authentication and key exchange triggered based on a second request transmitted from the first receiver, for a second key unique to the first receiver when a content is to be moved; and
a third unit configured to
receive an acknowledgement including a label of one of the first key and the second key from the first receiver,
encrypt the content by using one of the first key and the second key based on the label included in the received acknowledgement, and
transmit the encrypted content to the first receiver;
wherein the moving makes the content void at the transmitter after transmitting the encrypted content and the rendering or copying does not make the content void at the transmitter after transmitting the encrypted content.

5. The transmitter of claim 4, further comprising:
a fourth unit configured to transmit to the first receiver an error message if a key corresponding to the label included in the received acknowledgement is not present in the transmitter.

6. The method of claim 5, further comprising:
a fifth unit configured to notify completion of the one of the first authentication and key exchange and the second authentication and key exchange to the first receiver.

* * * * *